（12）United States Patent
Sydir et al.

(10) Patent No.: US 10,420,101 B2
(45) Date of Patent: Sep. 17, 2019

(54) TRAFFIC-AWARE SLOT ASSIGNMENT

(71) Applicant: Intel Corporation, Santa Clara, CA (US)

(72) Inventors: Jaroslaw J. Sydir, San Jose, CA (US); Yiting Liao, Sunnyvale, CA (US); Dave A. Cavalcanti, Portland, OR (US); Vallabhajosyula S. Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,298

(22) Filed: Sep. 29, 2017

(65) Prior Publication Data

US 2019/0104519 A1 Apr. 4, 2019

(51) Int. Cl.
*H04L 12/43* (2006.01)
*H04W 72/04* (2009.01)
*H04L 12/24* (2006.01)
*H04W 4/70* (2018.01)

(52) U.S. Cl.
CPC ......... *H04W 72/0446* (2013.01); *H04L 41/12* (2013.01); *H04W 4/70* (2018.02)

(58) Field of Classification Search
USPC ....... 370/241, 252, 254, 255, 256, 329, 330, 370/376, 395.4, 400, 458
See application file for complete search history.

(56) References Cited

U.S. PATENT DOCUMENTS

| | | | | |
|---|---|---|---|---|
| 2003/0227931 | A1* | 12/2003 | Chen | H04L 12/4633 370/408 |
| 2005/0259588 | A1* | 11/2005 | Preguica | H04L 45/04 370/248 |
| 2005/0259595 | A1* | 11/2005 | Preguica | H04L 45/16 370/254 |
| 2006/0173927 | A1* | 8/2006 | Beyer | G06F 17/30961 |
| 2006/0215583 | A1* | 9/2006 | Castagnoli | H04L 45/02 370/254 |
| 2006/0239211 | A1* | 10/2006 | Previdi | H04L 45/02 370/256 |
| 2012/0221678 | A1* | 8/2012 | Tanaka | H04L 1/1835 709/217 |

(Continued)

*Primary Examiner* — Kwang B Yao
*Assistant Examiner* — Nguyen H Ngo
(74) *Attorney, Agent, or Firm* — Schwegman Lundberg & Woessner, P.A.

(57) ABSTRACT

Aspects of traffic aware slot assignment are described, for example, in a multi-hop wireless network comprising a plurality of nodes. In some aspects, an apparatus of a wireless device is configured to decode signaling, received from a node of the multi-hop network, to determine an indication of a change to a topology of the multi-hop network. The apparatus is further configured to, in response to a determination, from the decoded signaling, of an addition of a second node to the multi-hop network topology, increment a total of a number of descendant nodes, and allocate one or more transmission slots to a number of unused slots in one or more transmission opportunity regions of a slotframe, wherein the slotframe includes a repeating pattern of one or more transmission opportunity periods for a plurality of nodes in the network.

33 Claims, 8 Drawing Sheets

(56) References Cited

U.S. PATENT DOCUMENTS

| | | | |
|---|---|---|---|
| 2013/0191688 A1* | 7/2013 | Agarwal | H04L 41/0873 |
| | | | 714/32 |
| 2016/0212729 A1* | 7/2016 | Bulten | H04W 72/048 |
| 2018/0091416 A1* | 3/2018 | Ghosh | H04W 76/25 |
| 2018/0131459 A1* | 5/2018 | Zhang | H04J 3/0641 |

* cited by examiner

TRAFFIC-AWARE SLOT ASSIGNMENT

TECHNICAL FIELD

Aspects pertain to wireless networks and wireless communications. Some aspects relate to wireless local area networks (WLANs) and Wi-Fi networks including multi-hop networks operating in accordance with the IEEE 802.15 family of standards. Some aspects relate to methods, computer readable media, and apparatus for a transmission opportunity region framework.

BACKGROUND

Many Internet of Things (IOT) applications involve enabling two-way communication with many resource constrained devices. Asset tracking and field monitoring are examples of applications involving data collection and aggregation, where sensors are deployed in a target area. Data from these sensors may be collected, for example, from a gateway node that provides connectivity to a remote backend system. Sensor nodes may be constrained in terms of processing power, storage and energy (e.g., battery). Wireless mesh network may be used to enable upstream or downstream communications with a gateway node.

DESCRIPTION OF ASPECTS

A number of medium access control (MAC) layer approaches have been proposed for wireless sensor networks. Unsynchronized contention-based approaches are simple, but have the problem that nodes do not know when data will be transmitted and therefore, idle listening is a problem. Other approaches involve a synchronized, scheduled MAC. In synchronized and scheduled MAC system, time is divided into periods (e.g., slots) and the transmissions between nodes happen within the slots. To have a common understanding of the slot timing, the nodes in a network maintain time synchronization. Synchronized networks have the advantage that communications between nodes can be scheduled, such that nodes know when to transmit and receive, which can reduce the amount of idle listening.

The IEEE 802.15.4 standard defines a physical (PHY) layer and several MAC layer options for multi-hop short range wireless communications. One of the MAC layer options is the Time Synchronized Channel Hopping (TSCH) MAC, a time synchronized, scheduled MAC. TSCH can be well suited for applications that require extremely low power consumption, such as asset tracking (e.g., field monitoring) applications. The IEEE 802.15.4 standard defines a slotframe construct, which describes a repeating pattern in time and frequency (e.g., channels) within which individual nodes in the network are assigned opportunities (e.g., one slot at a given channel) to transmit, receive, or do nothing (e.g., be idle). The IEEE 802.15.4 standard defines the slot structure and constructs that can be used to describe the transmission schedule within a multi-node, multi-hop network, but it does not specify the way the schedule is created or communicated to the nodes in the network.

Figure 1:
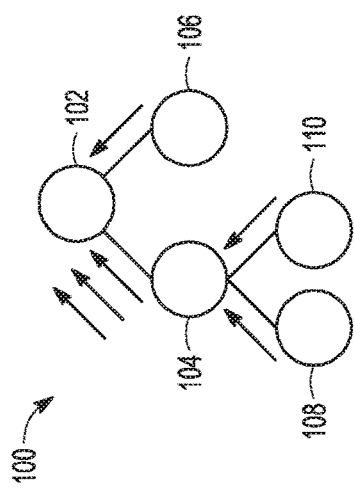
FIG. 1 illustrates an exemplary block diagram of nodes in a multi-hop system, according to some aspects.

FIG. 1 illustrates an application data traffic load 100 for a multi-hop topology, according to some aspects. In some aspects, node 102 represents a gateway and nodes 104 through 110 represent sensor nodes. Each arrow in FIG. 1, in some aspects, represents the data from one sensor node to another respective sensor node. According to FIG. 1, in some aspects, node 104 has two descendants or child nodes (e.g., nodes 108 and 110). In some aspects, a node may have an associated descendent node that is not a child node, for example node 102 may be associated with descendent nodes 108 and 110, however descendent nodes 108 and 110 may not be child nodes to node 102 (e.g., indirectly attached to node 102). As another example, if node 110 had an associated descendent node (e.g., a child node), node 104 may then have three descendent nodes (e.g., nodes 108, 110, and child node of node 110). Therefore, in some aspects, node 104 may have three data items for transmission (e.g., including one or more data items from nodes 108 and 110). In such aspects, nodes 106, 108, and 110 may not have any descendants and thus may only have data to transmit for themselves (e.g., one data item to transmit).

In some aspects, each sensor node in the multi-hop topology (e.g., a sensor data collection network) can collect samples and periodically transmit the samples to a gateway note (e.g., 102). In some aspects, each sensor node (e.g., each of sensor nodes 102-110) can generate and transmit the same amount of data as another sensor node. In some aspects, because not all sensor nodes are able to communicate directly with the gateway (e.g., sensor nodes 108 and 110), in some aspects, certain sensor nodes can transmit not only the data that they generate, but also the data that they receive from other sensor nodes (e.g., child nodes). For example, node 104 may transmit not only the data that it generates, but may also transmit the data it receives from sensor (e.g., child) nodes 108 and 110. In some aspects, the amount of data that a sensor node transmits can be proportional to the number of sensor nodes whose data it must relay (e.g., data transmitted by sensor node 104 may be proportional to two additional sensor nodes 108 and 110). In some aspects, the number of sensor (e.g., child) nodes whose data a node must relay can be the number of descendants that it has in the topology.

Some aspects include an optimized, contention-free schedule for transmission of application data to a gateway (e.g., node 102). In certain aspects of such a schedule, nodes (e.g., nodes 104-110) can transmit one at a time (e.g., with no contention) and the transmitters and receivers of the respective nodes can align their schedules such that a correct receiving node is always listening when a specific transmitting node is transmitting. Further, in some aspects, the number of transmit slots for a node can be proportional to a traffic load (e.g., proportional to a number of descendants of that node). In some aspects, a schedule can be determined dynamically based on a topology of nodes in a network when the positions of individual nodes in the topology and the resulting traffic load is not known at design time.

In some aspects, the positions of individual nodes in the topology and the resulting traffic load may also not be known at the time of deployment and therefore may be discovered as part of the operation of the network. In some aspects, it may be assumed that the maximum number of nodes in the system and the traffic pattern consisting of the period and amount of data transmitted by each sensor node during each period are known at deployment time and are provided as configuration parameters. For example, configuration parameters may be saved in memory of the respective sensor nodes (e.g., nodes 104-110) or transmitted from the gateway node 102.

Figure 2:
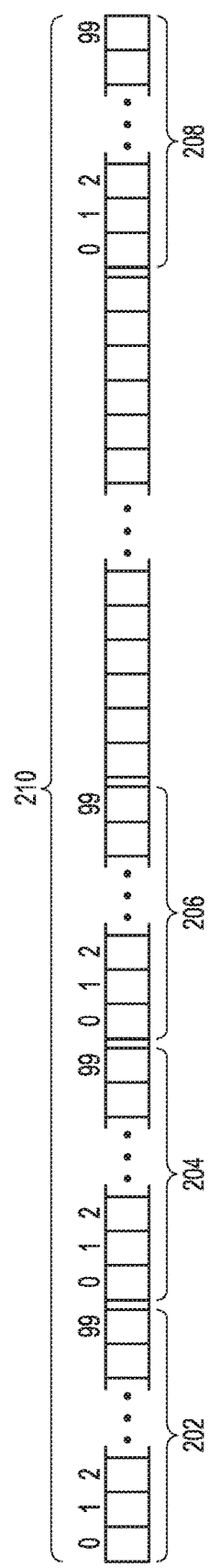
FIG. 2 illustrates a block diagram of transmission opportunity regions within a slot frame 200, according to some aspects.

FIG. 2 illustrates a block diagram of transmission opportunity regions within a slot frame 200, according to some aspects. In some aspects, sensor nodes in the multi-hop topology (e.g., the sensor data collection network) can receive and transmit data within one or more slotframes and a slotframe can be divided into transmission opportunity regions (e.g., 202-208) which can be at least as large (e.g., in terms of numbers of slots) as the maximum number of nodes in the system. In some aspects, the maximum number of nodes can be decided at design time or can be a configuration parameter set at system deployment time and stored within memory of a sensor device or transmitted from a gateway node. In another aspects, the number of nodes may be learned during a network formation stage.

In certain aspects, the number of transmission opportunity regions (e.g., 202-208) used can be larger than the actual number of nodes, but may not be so large that there are not enough transmission opportunities for the node with the largest throughput requirements. In some aspects, when a number of nodes in a system is fewer than the number used as a maximum number of nodes, the extra slots within each transmission opportunity region (e.g., 202-208) may not be used. However, in such aspects, unused transmission opportunity regions do not lead to idle listening because all nodes can be idle during unused slots.

In some aspects, a slotframe length (e.g., 210) can be 6000 slots and can correspond to 1 minute where each slot is 10 ms in duration. However, aspects are not so limited and a slotframe (e.g. a slotframe in a 702.15.4 TSCH network) may be of any length and may have a slot frame duration within a range of slot frame durations (e.g., within a 702.15.4 TSCH network). In some aspects, a maximum number of nodes can be 100 nodes, in which case the length of each transmission opportunity region (e.g., 202-208) may be 100 slots and there may be 60 transmission opportunity regions. In such aspects, a maximum number of transmission slots that can be allocated to a node can be 60 (e.g., one in each transmission opportunity region) per minute.

In some aspects, within each transmission opportunity region (e.g., 202-208), slots are allocated to nodes using a node identifier (ID) as an index. In some aspects, node IDs are unique identifiers in the range of $\{1, \ldots, Nmax\}$ where Nmax is the maximum number of nodes. For example, in some aspects, a maximum number of nodes may be bound by a slot frame period and the number of slots that a node may utilize. As a specific example, in a network with 100 nodes, where a slot frame has 6000 slots, each node may utilize up to 60 slots. As another example, in a network with 200 nodes, where a slot frame has 6000 slots, each node may utilize up to 30 slots. In another example, in a network with 6000 nodes, or a slot frame has 6000 slots, each node may utilize up to 1 slot. In some aspects, the amount of throughput in a network and memory constraints of a coordinator node may limit the maximum number of nodes.

In some aspects, node IDs can be assigned to nodes at the time of deployment or can be derived from a node MAC layer address. For example, slot 1 within each transmission opportunity region can be dedicated for transmissions by the node with node ID 1 (e.g., node 102), and slot 2 within each transmission opportunity region (e.g., 202-206) can be dedicated for transmissions by the node with node ID 2 (e.g., node 104).

In some aspects, a determination of a traffic load at each node in a multi-hop system can be performed in a variety of ways. In some aspects, a traffic load may be calculated the at a node based on a number of descendants that the node has in a topology (e.g., node 104 having nodes 108-110 as descendants). In some aspects, it may be assumed that a node knows the node identifiers (IDs) of its child nodes in a topology. In some aspects, a node may also know the total number of its associated child nodes, and may know the total number of its associated descendant nodes. A node can obtain this information, for example, by using existing routing protocols for low power networks.

Figure 3:
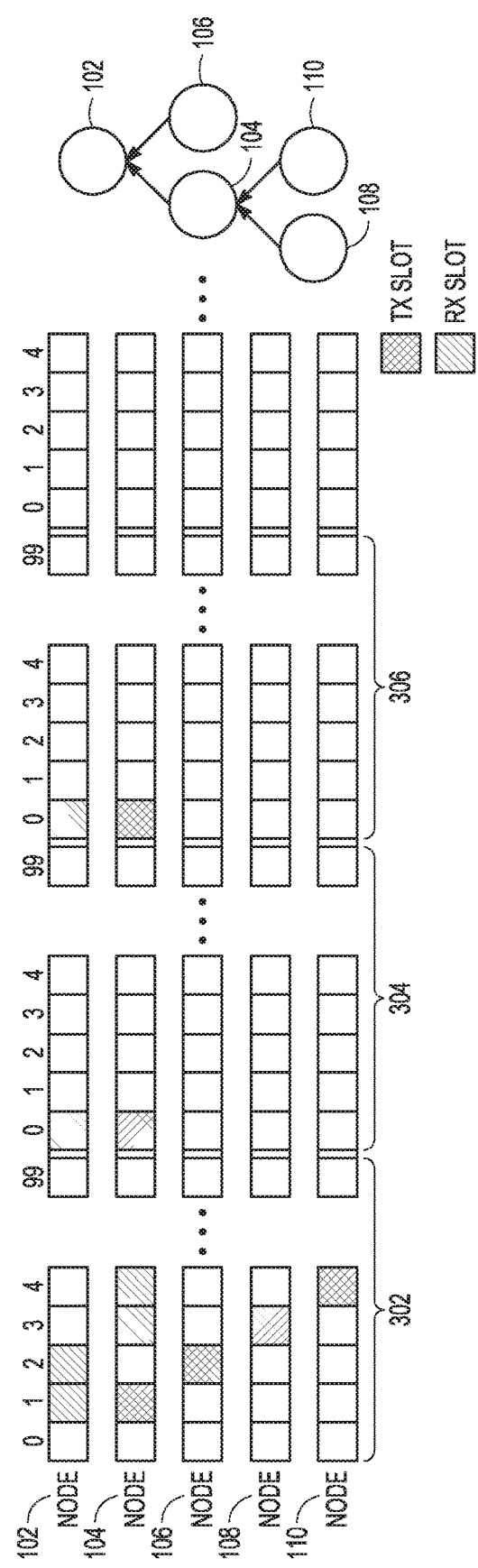
FIG. 3 illustrates a block diagram of a method of slot allocation, according to some aspects.

FIG. 3 illustrates a block diagram of a method of slot allocation for one slotframe, according to some aspects. In the diagram each row represents the slot assignments for a node within the one slotframe. In some aspects, the method of slot allocation involves transmit (Tx) and receive (Rx) slot allocations for an exemplary network topology. In some aspects, sensor nodes (e.g., sensor nodes 102-110) may be configured to receive and transmit within opportunity regions (e.g., opportunity regions 302-306) within the slotframe. Three opportunity regions are shown (e.g., 302-306). In some aspects, slots 1 and 2 illustrated in the row associated with node 102, as well as slots 3 and 4 illustrated in the row associated with node 104, for example, represent slots in which nodes 102 and 104 may be assigned to receive (e.g., receive data from nodes 104, 106, 108, and 110, respectively. In some aspects, nodes 104, 106, 108, and 110 may be assigned to transmit in slots 1, 2, 3, and 4 of the respective slotframes of nodes 104, 106, 108, and 110.

In some aspects, node 102 is a coordinator node which may transmit a beacon message for establishing a slot allocation process. In such aspects, nodes 104, 106, 108, and 110 may listen for beacon message. In some aspects, after node 104 receives a beacon message from node 102, node 104 may transmit a response message to node 102 to be admitted to the network. In some aspects, for node 104 to become part of the network, node 104 may associate and synchronize with node 102, which may allow node 102 to later create a route, described further below. Likewise, node 106 may join the network following the same procedure as node 104. In some aspects, once node 104 and node 106 become part of the network, they may also transmit beacon messages similar to node 102. In some aspects, once node 108 and node 110 receive a beacon message, for example, from node 104, node 108 and node 110 will attempt to associate with the same network following the same procedures as described with respect to nodes 102, 104 and 106.

In some aspects, once nodes 104, 106, 108, and 110 are associated with the network, each of nodes 104, 106, 108, and 110 may attempt to transmit routing messages to establish a route. In some aspects, nodes 106, 108, and 110 are each assigned a transmit slot in transmission opportunity region 302. In such aspects, nodes 106, 108, and 110 may only have one data item to transmit per period (e.g., their own sensor data). Node 106 may transmit in slot 2 of the transmission opportunity region 302, node 108 may transmit in slot 3 transmission opportunity region 302 and node 110 may transmit in slot 4 of transmission opportunity region 302. In some aspects, each node may know whether it is a coordinator node or a non-coordinator node (e.g., a child node of the coordinator node). For example, this may be predetermined and preconfigured for the network.

In some aspects, at the beginning of a network formation state, a node (e.g., node 102) may be preconfigured as a coordinator node and may begin transmitting beacon messages to other nodes (e.g., nodes 104-110) in the network. In some aspects, one or more nodes within a one-hop communication range from the coordinator node (e.g., nodes 104-110) may receive one or more beacons from the coordinator node (e.g., node 102). In some aspects, the coordinator node 102 may transmit the beacon messages according to a beacon period, which may be preconfigured (e.g., within device memory). In some aspects, once a node (e.g., one of nodes 104-110) receives a beacon message from the coordinator node 102, that node may attempt to associate with the coordinator node 102 to join the network. In some aspects, the node can attempt to associate with the coordinator node 102 by transmitting a response message (e.g., DIO message) to initiate an association and synchronization process. In some aspects, once a node receives a beacon message from a coordinator node 102 it may begin synchronization by synchronizing in a slot manner according to the coordinator node 102, for example, by aligning a slot index and slot boundary according to a slot index and a slot boundary of the coordinator node 102.

In some aspects, in a slot allocation scheme, a shared broadcast slot frame can be used for all the nodes in the network. For example, within the shared broadcast slot frame, all nodes in the same network can wake up and either listen (e.g., receive) or transmit in this shared slot, based on the broadcast slot frame period. In some aspects, a node may establish a shared broadcast slot frame and broadcast slot frame period during synchronization with another node of the network. In some aspects, if a node has a message for transmission, during the shared broadcast slot frame the node may transmit the message. If the node does not have a message for transmission, during the shared broadcast slot frame, the node may refrain from transmitting and may instead listen for a message. In some aspects, once a node is synchronized with another node (e.g., once node 104 is synchronized with node 102), the two synchronized nodes (e.g., nodes 104 and 102) may then create a shared broadcast slot frame.

In some aspects, the shared broadcast slot frame may have a predefined period (e.g., stored in memory within a node). A broadcast slot frame period, in some aspects, can define the frequency of occurrence of the shared broadcast slot frame. For example, a broadcast period value may indicate that a shared broadcast slot frame will occur once out of every 9 slots, such that two or more nodes (e.g., any node that has successfully associated with the network) may wake up on a first slot of a slot frame to either listen (e.g., to receive a message) or transmit a message. In some aspects, all nodes within a network may use the shared broadcast slot frame prior to the establishment of a route schedule. The shared broadcast slot frame, for example, may be used by the nodes in the network to exchange control messages to establish relationships with one another (e.g., child nodes establish connections with parent nodes).

In some aspects, once all of the nodes in the network have established connections with their respective child or parent nodes, they may establish an additional slotframe (e.g., a unicast slotframe) with dedicated (e.g., unique) slot assignment with those nodes, such that all nodes in the network may then receive and transmit messages in a non-conflicting manner. In some aspects, dedicated slot assignments can be made in the same slotframe as broadcast slot assignments. For example, once all of the nodes in the network have established connections and a unicast slotframe, node 102 may be allocated slots 1 and 2 in transmission opportunity region 302 to receive data from nodes 104 and 106, and node 104 may be allocated slots 3 and 4 in transmission opportunity region 302 to receive data from nodes 108 and 110. In some aspects, node 104 may be configured to transmit in slot 1 of transmission opportunity regions 302, 304, and 306, to accommodate its own data and the data from nodes 108 and 110.

In some aspects, the determination of the number of transmission slots to be allocated to a node is made based on the number of descendants that a node has in the topology and on the number of slots required to transmit the sensor data from one node. In some aspects, one slot per period may be allocated for each node, but more than one slot per period may be allocated, as this is not limiting. It should be noted, that the basic structure of transmission opportunity regions and exclusive slot assignments within each region can be used to allocated slots to nodes using any method for determining the number of slots required for each node.

In some aspects, the allocation method described above can be used in a distributed or centralized scheduler implementation. No additional packet exchange may be necessary for a node to know when to wake and when to sleep. In some aspects, in a distributed implementation each node may allocate and deallocate Tx and Rx slots in one or more transmission opportunity regions as it learns of changes in the topology around it. In some aspects, each node may maintain the following information: (1) a Node ID, which may be derived from a MAC address, (2) a slotframe period, which may be a configuration parameter, (3) a length of an opportunity region, which may be a configuration parameter, (4), a number of slots to allocate for each descendant, which may be a configuration parameter, (5) a total number of decendents, which may be learned from a network layer routing algorithm (e.g. RPL), (6) a list of children, which may be learned from a network layer routing algorithm, (7) a Node Id of the child (ID), which may be derived from a child MAC address, and (8) a number of descendants for a child node.

In some aspects, at each node, a total number of slots allocated for transmission within a period P may be calculated by $(T+1)*N$. In some aspects, within each transmission opportunity region, the node ID of the transmitting node is used as the slot index. The identity of the receive slots for a node may be determined separately for each child node that a node has in a network topology. In some aspects, a number of slots for each child may be determined by $(TC+1)*N$. A child's node ID may be used as the index within each opportunity region to identify these slots.

Figure 4:
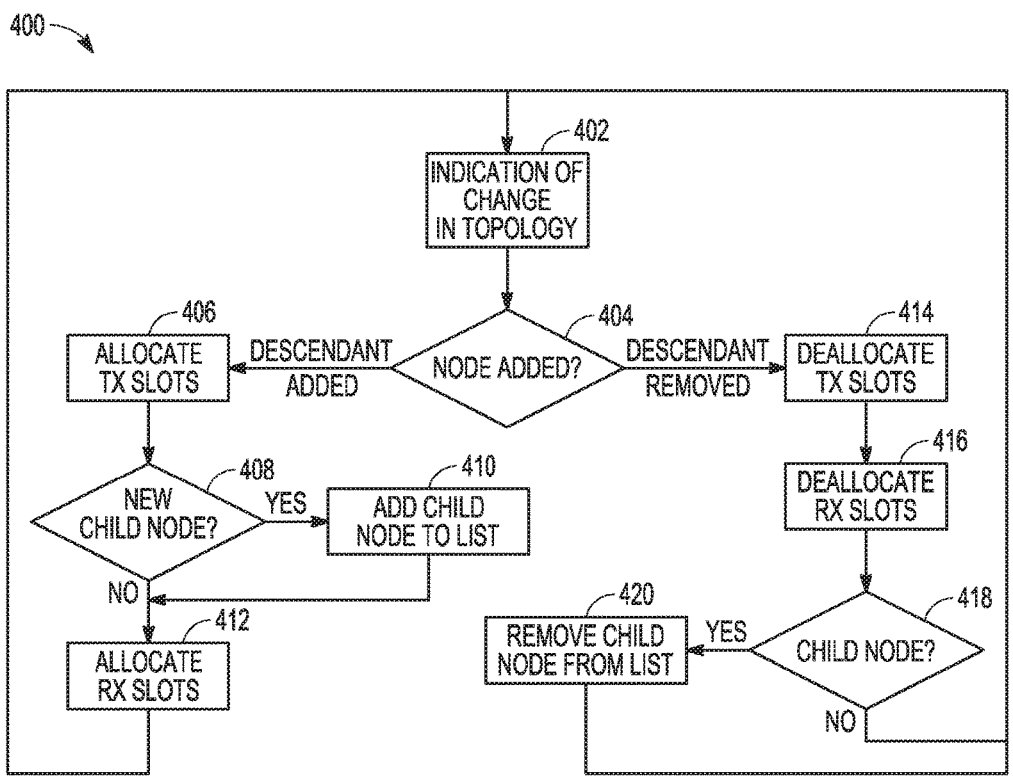
FIG. 4 illustrates a flow chart of an exemplary method of slot allocation, according to some aspects.

FIG. 4 illustrates a flow chart of an exemplary method of slot allocation, according to some aspects. It is important to note that aspects of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-9, although it is understood that the method 400 may be practiced with any other suitable systems, interfaces and components. For example, reference may be made to the scenario 400 in FIG. 4 described earlier for illustrative purposes, but the techniques and operations of the method 400 are not so limited.

In some aspects, the method of slot allocation (e.g., 400) may run continuously on each node allowing a slot assignment to change as a network topology changes. In some aspects, in 402, a node may wait for an indication of a change in the topology, for example, a change indicating that a node is added or removed from the topology (e.g., at 404). In some aspects, in 406, if a node (e.g., descendant node) has been added, the node may increment a total number of descendant nodes (e.g., to a list stored in memory) and may allocate N number more transmission slots into a next N number of unused transmission opportunity regions. In some aspects, at 408, the node may determine that the new descendant is a new child node (e.g., connects directly to the node) and may add the new child node to a list (e.g., a list of children stored in memory) at 410. In some aspects, a number of descendants associated with a child node maybe incremented and N number more receive (e.g., receive slot) allocations may be created using the node ID of the child node as an index, at 412.

In some aspects, the node may determine that a node (e.g., descendant node) has been removed, at 414, and in such aspects the procedure may be the reverse. For example, a total number of descendants may be decremented (e.g., from the list stored in memory) and a last N number of transmit allocations (e.g., transmission slot allocations or transmission opportunity regions with the largest indices) may be deallocated or removed, at 414. Similarly, in some aspects, N number of receive allocations associated with the child through which the descendant was connected may be deallocated or removed at 416. In some aspects, if the node determines that the removed descendant is a child node (e.g., direct child), at 418, the record of the child may be removed from a list (e.g., the list of children stored in memory) at 420. In some aspects, a similar process May be performed by a central node, such as a gateway node by maintaining the same information for each of the nodes. A centralized implementation can either notify individual nodes of one or more added or removed slot allocations, as topology changes are observed, or can inform nodes of a new allocation after the topology settles.

In some aspects, a network (e.g., mesh network for IoT applications such as asset tracking and field monitoring) may support upstream and downstream communications with a gateway node. In some aspects, upstream traffic may originate in one or more sensor nodes sensors and travel to the gateway node to form a multi-point to point (MP-to-P) topology. In some aspects, upstream traffic may comprise periodic data (e.g., sensing reports) and events (e.g., alarms when a device malfunctions or a certain variable being sensed crosses a given threshold). In some aspects, downstream traffic may originate at the gateway and may be aimed at individual sensor nodes. In some aspects, downstream traffic may include commands or configuration updates (e.g., device specific query, actuation or configuration message). In some aspects, a downstream topology may be a point to multi-point (P-to-MP) topology that is an inverse of the upstream topology. In some aspects, to enable such data traffic, a routing protocol may be used to find the path and create connections between two or more devices.

In some aspects, a route balancing scheme may utilize a routing Protocol, for example, Ipv6 Routing Protocol for Low-Power and Lossy Networks (RPL). In some aspects, the route balancing scheme (e.g., comprising RPL) may utilize a Destination Oriented Directed Acyclic Graph (DODAG) to create routes to a root node (e.g., gateway node) to support downward (e.g., P-to-MP) and upward (e.g., MP-to-P) communications. In such aspects, an Objective Function (OF) may be defined to calculate the cost of a route to a root node (e.g., gateway node) and the route that minimizes the OF cost may be chosen for the transmission. In some aspects, an OF may specify how routing constraints and other functions are considered during a topology construction. Some examples of commonly used OFs may include metrics such as hop counts, Expected Number of Transmissions (ETX), and node power.

Figure 5:
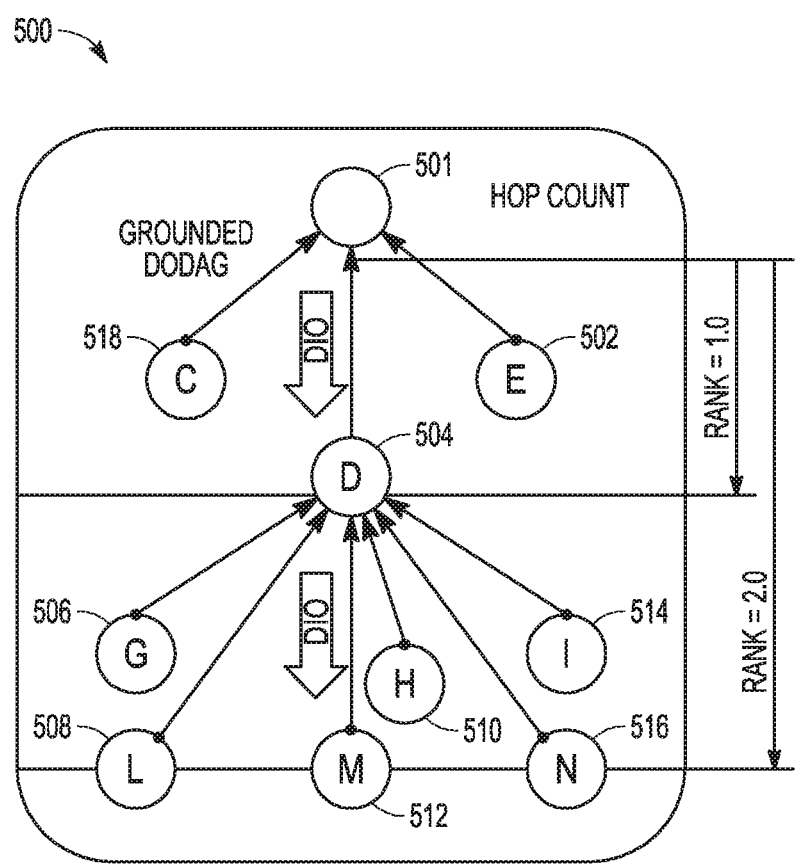
FIG. 5 illustrates a block diagram of an exemplary method of route construction, according to some aspects.

FIG. 5 illustrates a block diagram of an exemplary method of route construction, according to some aspects. In some aspects, a route construction 500 may utilize a DODAG mechanism. For example, RPL may utilize three types of control messages for topology maintenance and information exchange, including DIO (DAG Information Object), DIS (DAG Information Solicitation) and DAO (Destination Advertisement Object). In some aspects, to form a network, a root node (e.g., 502) may begin sending out DIO messages that carry information regarding broadcasting node, for example, including a rank, an OF, and DAG-ID.

In some aspects, when a node receives a DIO from another node (e.g., a candidate parent node), the node may calculate its own rank relative to the rank of the candidate parent node. In such aspects, the rank of the candidate parent node may be included in signaling received from the candidate parent node, and the node may calculate the cost to reach the coordinator through the candidate parent node to determine whether it will select the candidate parent node as its parent. In some aspects, nodes may only consider another node as a candidate parent node is that node has a lower rank than itself.

In some aspects, DIOs may propagate down to the most distant nodes from a root node in creating a DODAG. When a node joins a network, in certain aspects, that node may either wait for a DIO to find its parent or send a DIS to solicit a DIO from a RPL node. In some aspects, nodes may utilize DAOs to propagate destination information upwards along the DAG to help create the downward routes. During such a route creation process, an unbalanced topology could be formed and result in data burden on certain relay node.

FIG. 5 shows, in certain aspects, an example of how an unbalanced topology is built. During network formation, node 504 may receive a DIO from a root node (e.g., 502) and may then broadcast its own DIO to the network (e.g., to nodes 506-516). In some aspects, nodes 506-516 may hear the broadcasted DIO and decide to select node D as their parent (e.g., based on the calculated path cost). In some aspects, later, nodes 518 and 520 may begin broadcasting DIOs, however, nodes 506-516 may not switch to a new parent (e.g., from node 504 to one of nodes 518 or 520) if that candidate parent node does not offer an improvement in at least the path cost.

In some aspects, to alleviate such an unbalanced topology, for example, in a dense environment where multiple candidate parents with a similar path cost are available, may be optimized through a random offset or through information (e.g., child information) included in a packet (e.g., DIO packet). In some aspects, a random path cost offset may be added to a candidate parent during a route selection process. For example, a random offset value may be generated locally at each node in a network and may be fixed for each candidate parent once it is generated. In some aspects, a range and distribution of the random offset value may be designed based on the objective function and the desired topology. In certain aspects, an offset function may be utilized to generate the random offset value and may be hard-coded in a node firmware or software stack and defined by a gateway node and passed through the network (e.g., via DIO messages).

In some aspects, a random offset function may be defined with a uniform distribution in [0, 1]. In some aspects, when a node in a network receives a new DIO from a candidate parent node, it may generate a random offset value for the candidate parent node following the defined distribution. In such aspects, once the node generates a random offset value for the candidate parent node, the random offset value may be fixed for the network, unless the network topology is refreshed. In some aspects, when node 506 receives one or more DIOs (e.g., from any one of nodes 504, 518, or 520) a path cost to connect to those nodes may be defined as $2+ROG_{504}$, $2+ROG_{518}$, $2+ROG_{520}$, respectively.

In some aspects, due to the distribution of a random offset value, node 506 may have an equal probability to connect to one of nodes 504, 518, or 520. In such aspects, a similar behavior may apply to nodes 506-516. Therefore, in some aspects, instead of all nodes connecting to node 504, nodes 506-516 may have an equal chance to connect to rank 1.0 nodes 504, 518, or 520. In some aspects, the value range of the random offset is within [0, 1], still guaranteeing that a rank 1.0 node has smaller path cost than a rank 2.0 node. However, aspects are not so limited and for different network requirements, different distributions may be applied to different parents allowing nodes favor specific parents over others.

Figure 6A:
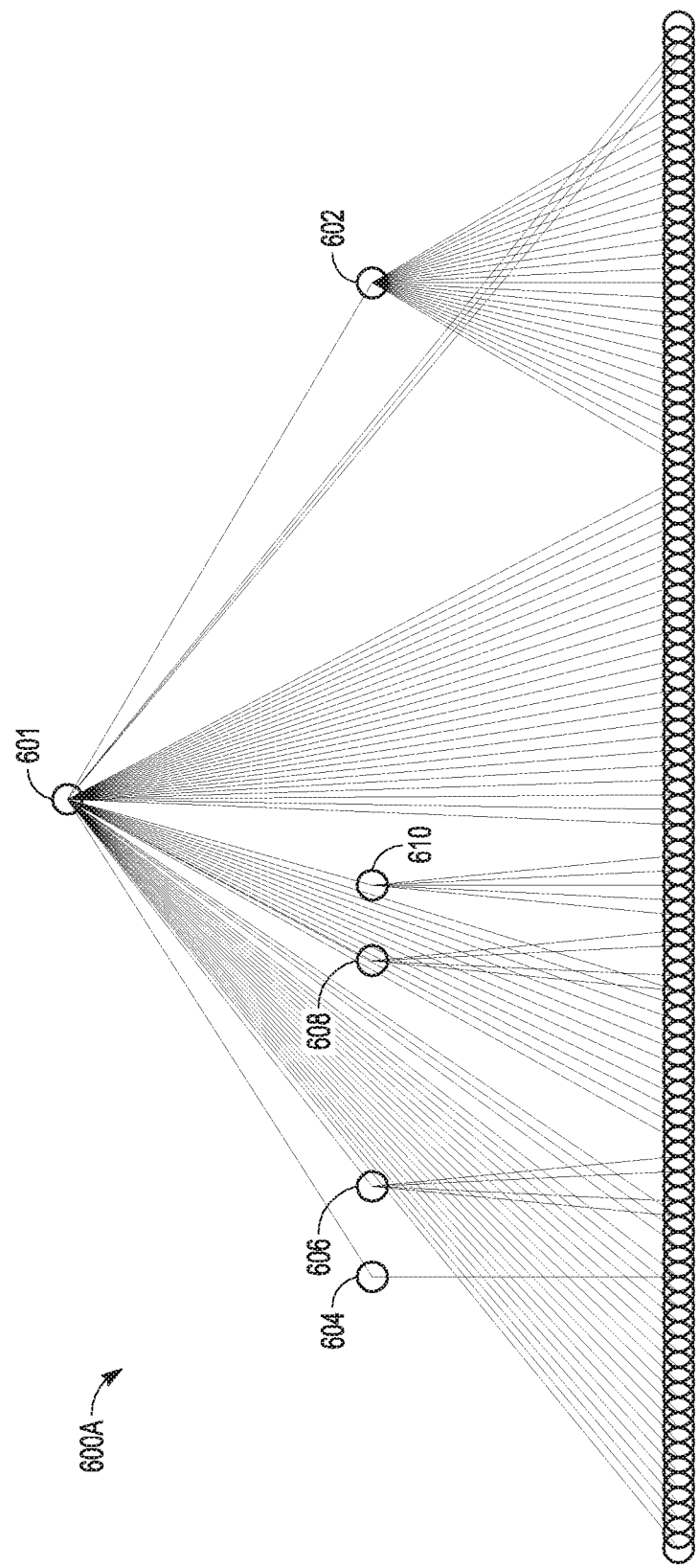
FIG. 6A illustrates a block diagram of an exemplary topology of nodes within a multi-hop system, according to some aspects.
Figure 6B:
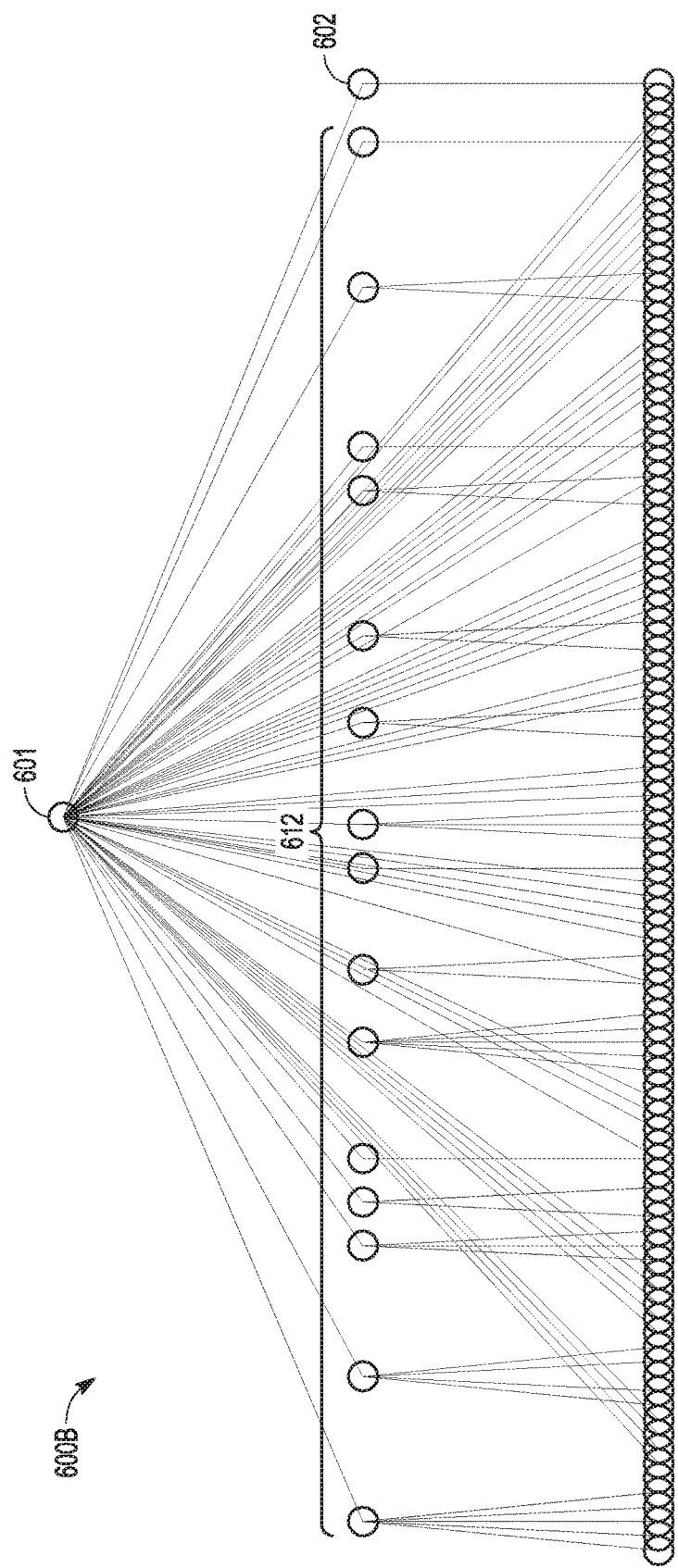
FIG. 6B illustrates a block diagram of an exemplary topology of nodes within a multi-hop system, according to some aspects.

FIG. 6A illustrates a block diagram of an exemplary topology of nodes within a multi-hop system, according to some aspects. In some aspects, FIG. 6A illustrates a topology 600A of a network (e.g., 100-node low-power mesh network) without a route balancing scheme. In such aspects, a node (e.g., node 602) may become a parent of many nodes, creating an unbalanced topology. FIG. 6B illustrates a block diagram of an exemplary topology of nodes within a multi-hop system, according to some aspects. In some aspects, FIG. 6B illustrates a topology 600B of a network (e.g., 100-node low-power mesh network) with a route balancing scheme (e.g., including a random offset or child information in a packet). As shown in FIG. 6B, a route balancing scheme (e.g., random offsets) may allow the creation of a variation of a path cost in equivalent nodes, allowing a child node to switch a candidate parent node. In some aspects, nodes 612 may include additional nodes (e.g., nodes in addition to nodes 604-610 of FIG. 6A) an may alleviate a burden on node 602.

In some aspects, parent selection optimization may be accomplished through the use of packets (e.g., DIO packets) to advertise a current number of children (e.g., child information included in a DIO packet). In such aspects, each node in a network may use this information when making a parent selection decision. In some aspects, additional information such as a traffic load or battery state of a candidate parent node can also be used for this purpose. In some aspects, for a RPL protocol, nodes may periodically broadcast DIO packets to a network for DODAG discovery and maintenance.

In some aspects, a broadcast (e.g., a DIO message) may include, within its format, an indication (e.g., advertisement) of a current number of children. In some aspects, the indication may comprise a 2-type field in a DIO message to represent how many children a node (e.g., candidate parent node) currently has. In some aspects, each time a DIO message is transmitted, child information may be included in the DIO message. To optimize a parent selection, in some aspects, a node may choose an alternative parent node if a new candidate parent is saturated or a current parent has been overloaded. In some aspects, the parent switching may happen with a certain probability so that when individual nodes make local decisions about a parent selection, the network may eventually converge to a stable topology.

Figure 7:
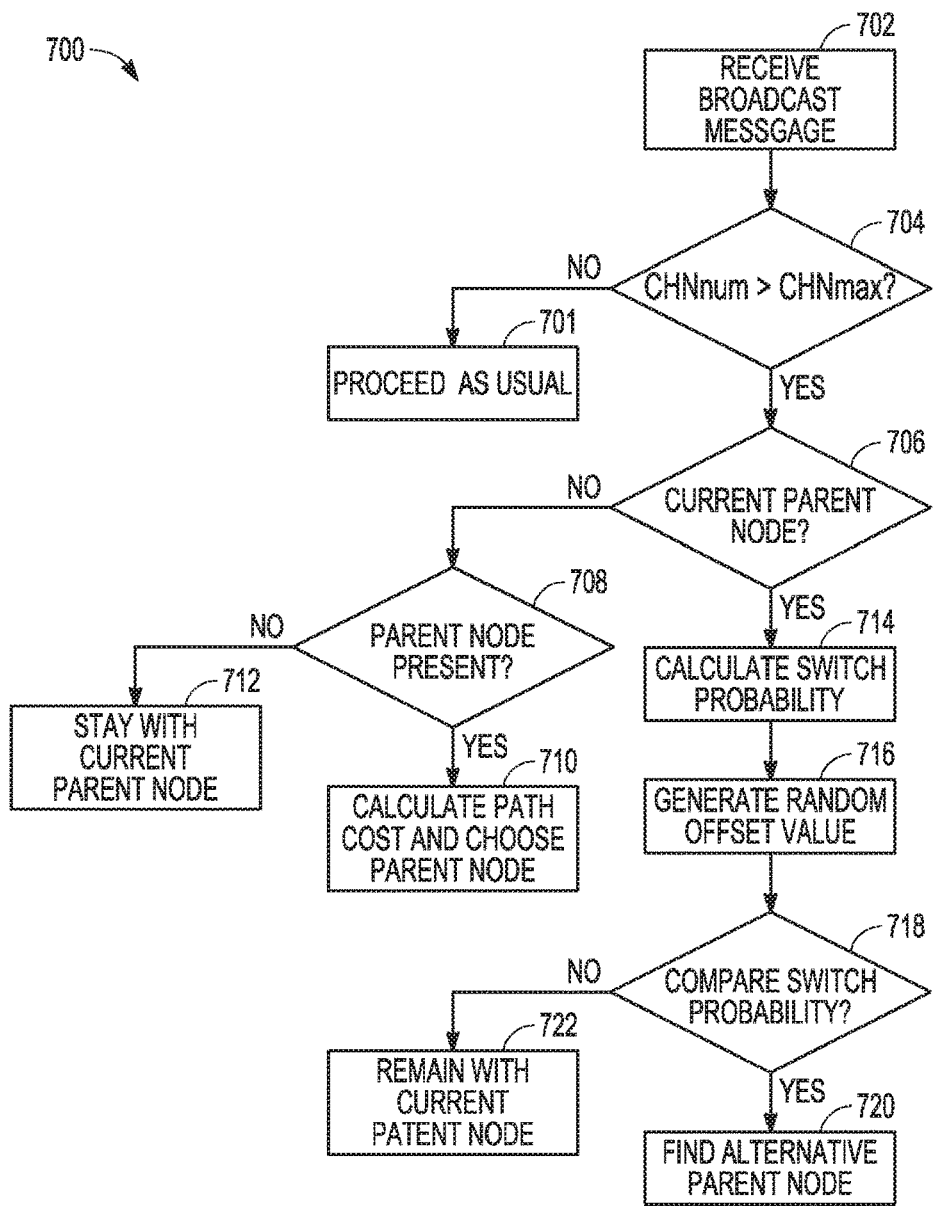
FIG. 7 illustrates a flow chart of an exemplary method of parent selection, according to some aspects.

FIG. 7 illustrates a flow chart of an exemplary method of parent selection, according to some aspects. It is important to note that aspects of the method 700 may include additional or even fewer operations or processes in comparison to what is illustrated in FIG. 7. In addition, embodiments of the method 700 are not necessarily limited to the chronological order that is shown in FIG. 7. In describing the method 700, reference may be made to FIGS. 1-7 and 9, although it is understood that the method 700 may be practiced with any other suitable systems, interfaces and components. For example, reference may be made to the scenario 700 in FIG. 4 described earlier for illustrative purposes, but the techniques and operations of the method 700 are not so limited.

In 702, a node (e.g., node 506) in a network may receive a broadcast message (e.g., DIO message) from a candidate parent node (e.g., node 504). In some aspects, at 702, when choosing a parent, a node may first look at a route metric (e.g., rank) and select a candidate parent node using the metric. In some aspects, at 702, the node may only consider a candidate parent node that has lower route metric (e.g., rank) than itself as a candidate parent. In such aspects, at 704, the node may then look at an advertized number of children (e.g., by decoding child information from a received broadcast message, such as a DIO message) and avoid candidate parent nodes whose child count is at or above a threshold. For example, at 701, the node may proceed as usual and disregard the broadcast message if the advertized number of children is above a maximum threshold $CHN_{MAX}$. In some aspects, when no other choice is available, the node may select a candidate parent node as its parent node that is above the threshold.

In some aspects, at 706, the node may determine whether the candidate parent node is a current parent node. In such aspects, if the candidate parent node is not a current parent node, the node may determine whether it has a parent node at 708. If the node has no current parent node, it may calculate a path cost and choose a candidate parent node as its parent node at 710, such as the candidate parent node (e.g., node 504) that transmitted the broadcast message at 702 received by the node. In some aspects, if the node determines that it does have a parent node, the node may decide to remain with the current parent node, at 712. In some aspects, if the node determines that the candidate parent node is the current parent node at 706. Further in some aspects, at 716, the node may generate a random offset value (e.g., within [0, 1]).

In some aspects, the node at 718 may then determine a probability (e.g., switch probability) to decide whether to switch from its current parent node. For example, a current parent node may be overloaded, and based on the calculated switch probability (e.g., at 714), the node may choose to switch to another candidate parent node, based on a switch probability calculated at 714. For example, at 720, the node may check a parent node list (e.g., stored in memory) to find an alternative parent node. In other aspects, the node may decide to remain with a current parent node based on the calculated switch probability in 722. In such aspects, the determining of the probability may allow the nodes to converge to a stable route instead of bouncing back and forth among different parent candidates. In some aspects, the probability is used to guarantee that when a parent is overloaded, the number of children that decides to switch parent correspond to the number of children the parent is overloaded by. In such aspects, CHNmax may represent a maximum number of children recommended for a parent node and CHNnum may represent a number of children of a current parent node, a probability to switch to a different parent node may be defined as: pchg=(CHNnum−CHNmax)/CHNnum.

In some aspects, for a parent with CHNnum children, CHNnum−CHNmax children may choose to switch parent nodes (e.g., at 720) when receiving updated broadcast message (e.g., DIO message). In other aspects, the node may choose to stay with the current parent at 722. In some aspects, an enhanced beacon (EBs) may contain information about a schedule of a network and may be sent periodically from each node in the network (e.g., 702.15.4 TSCH network). In some aspects, a broadcast traffic schedule framework can be implemented in a 702.15.4 TSCH network or other time synchronized scheduled MAC systems. In some aspects, in a scheduled MAC, a shared broadcast slotframe may be utilized for nodes to exchange packets before a dedicated slotframe has been established.

Figure 8:
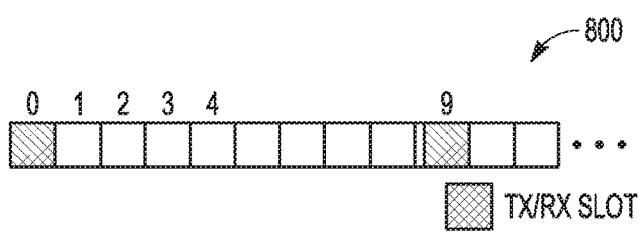
FIG. 8 illustrates a block diagram of a shared broadcast slotframe, according to some aspects.

FIG. 8 illustrates a block diagram of a shared broadcast slotframe, according to some aspects. In some aspects, the throughput of a slotframe 800 can depend on a length of the slotframe and the number of nodes in a network. In some aspects, the slotframe 800 may have one slot (e.g., slot 0) allocated as a shared transmit and receive slot, and the same allocation may be made to all nodes in a network. Therefore, in some aspects, all the nodes in the network may be configured to transmit packets (e.g., in a Carrier Sense Multiple Access (CSMA) manner) at a given shared slot (e.g., slot 0). In some aspects, during a network formation state, nodes may all rely on a shared broadcast slot (e.g., slot 0) to exchange control messages for creating routes. In some aspects, a small slotframe size may be needed to support the control packet throughput and to avoid a high collision rate that can delay the formation of a network. In some aspects, when a network enters an operation state, the number of control messages required to maintain the topology decreases, therefore, the activity in a shared broadcast slotframe may be very low. Therefore, in some aspects, a slotframe size can be increased to reduce an amount of unnecessary idle listening.

In some aspects, to support an adaptive broadcast slotframe bandwidth, a baseline slotframe length may be defined to provide sufficient bandwidth for peak control traffic load. In some aspects, a broadcast slotframe length multiplier can be applied to a baseline slotframe length to produce a slotframe length that is a multiple of the baseline slotframe length. In some aspects, broadcast slotframe length multiplier can be used when changes to broadcast traffic occur, for example, after a network enters an operation (e.g., stable) state following a formation stage.

In some aspects, a gateway may have knowledge of a network size (e.g., a number of nodes that can join the network) before the network is established. In some aspects, during a routing process (e.g., network formation state), the gateway node may have knowledge of how many nodes have successfully created routes within the network. In some aspects, when a node establishes a route to the gateway, the node enters a stable state and the amount of control packets it transmits may be reduced. Therefore, in some aspects, the gateway node can use a pre-define threshold value (e.g., p), as shown in equation (1) to determine whether to change a network state. In some aspects, a threshold can be determined based on a network density or power constraints, among other factors.

$$\text{network state} = \begin{cases} \text{formation} & \text{number of routed nodes/network size} \leq p \\ \text{operation} & \text{number of routed nodes/network size} > p \end{cases}$$

In some aspects, the gateway can use a network state to determine a bandwidth requirement for broadcast traffic. The gateway may also use other information such as the number of nodes in the network in making this determination. In some aspects, a gateway can express a bandwidth requirement for broadcast traffic using a broadcast slotframe length multiplier. In determining the state of a network, in some aspects, individual nodes may monitor an amount of control traffic from one or more neighbor nodes and may transmit a message to the gateway indicating an amount of control traffic detected from the neighbor nodes. In some aspects, a gateway may use this information to determine a state of the network. In some aspects, the operation of the network may be divided into states, in addition to a network formation state and an operation or stable state, which may allow finer gain control over broadcast slotframe bandwidth.

In some aspects, a change in broadcast slotframe bandwidth may be communicated by nodes in a network. In some aspects, the bandwidth of a broadcast channel can be communicated to the nodes, for example, by an indication of a broadcast slotframe period in an Enhanced Broadcast (EB) packet. In some aspects, a node (e.g., gateway node) may begin broadcasting, for example, EB packets at a given EB interval with a specific broadcast slotframe multiplier (e.g., multiplier of 1). In such aspects, when other nodes in the network hear the EB, they may associate with the network and begin sending EBs themselves. In some aspects, if those nodes have not selected a candidate parent node (e.g., preferred parent), they may set their broadcast slotframe multiplier based on the last received EB. In other aspects, if such nodes have found a candidate parent node (e.g., preferred parent), they may set their broadcast slotframe multiplier based on the EB from their preferred parent. In some aspects, such mechanisms guarantee that when a change in broadcast slotframe multiplier happens at a node (e.g., gateway node), the information may be correctly passed down through a network topology (e.g., mesh topology).

In some aspects, a field may be included within a EB packet to provide, for example, a network state update. In some aspects, as the state of a network changes, a node (e.g., gateway node) may determine that a different amount of bandwidth is required for broadcast traffic, and may modify the broadcast slotframe multiplier that it may advertised one or more EBs. In such aspects, such changes may be distributed through a topology as nodes receive EBs from their parents and send their own EBs with a new multiplier. In some aspects, the bandwidth of the broadcast slotframe may be determined by the broadcast slotframe length multiplier (e.g., advertised in the EBs). In some aspects, the multiplier may be determined by a node (e.g., gateway node) and may change over the lifetime of the network as the state of the network or other operating conditions change.

In some aspects, when a node (e.g., gateway node) determines that a broadcast slotframe length multiplier should change, it may assign an absolute slot number (ASN) at which the new multiplier should be applied. In some aspects, the scheduled ASN may be included as a field in the EB, allowing allows all of the nodes in the system to begin using the new slotframe schedule at the same time. In some aspects, if the change of schedule happens right after each node receives the status update from an EB packet, some nodes will switch to a new schedule earlier than the other nodes. A mismatch of schedules among nodes may cause some packet losses. Therefore, in some aspects, when a node (e.g., gateway node) detects a change of network state, it may also estimate how much time it will take to propagate the information to all the nodes in the network and configure the "scheduled ASN" to inform the nodes when the schedule change should happen, thus helping to alleviate the packet losses caused by the unaligned slot schedules.

Figure 9:
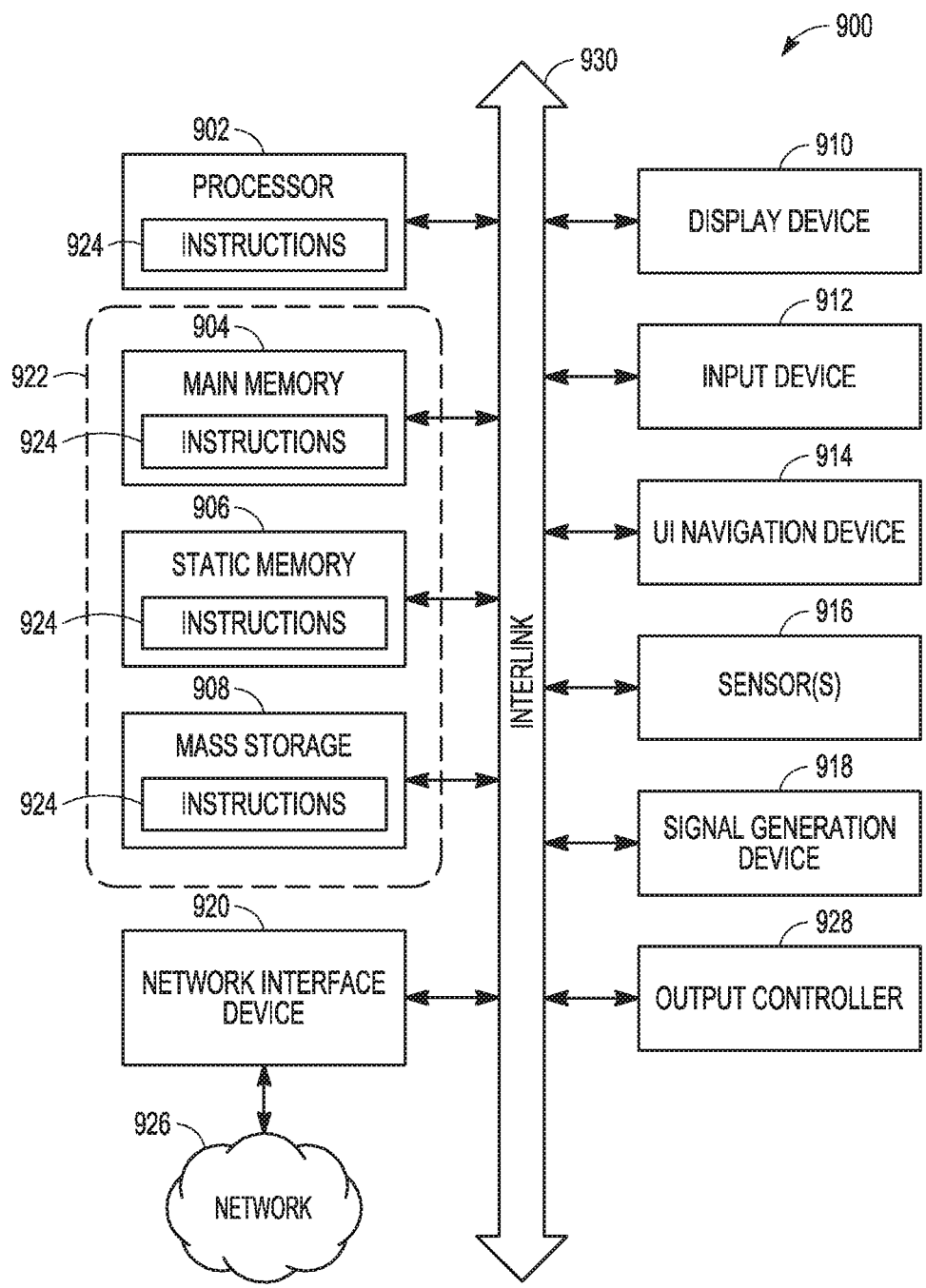
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a storage element, such as a main memory 904, a storage element, such as a static memory (e.g., memory or storage for firmware, microcode, a basic-input-output (BIOS), unified extensible firmware interface (UEFI), etc.) 906, and a storage element, such as a mass storage 908 (e.g., hard drive, tape drive, flash storage, or other block devices) some or all of which may communicate with each other via an interlink (e.g., bus) 930. The machine 900 may also be configured to transmit, store, and/or retrieve data utilizing cloud computing, software as a service (SaaS), and/or other computer cluster configurations (e.g., cloud storage). The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a wireless device configured to operate as a node in a multi-hop wireless network comprising a plurality of nodes, the apparatus, comprising: processing circuitry configured to: decode signaling, received from a node of the multi-hop network, to determine an indication of a change to a topology of the multi-hop network; and in response to a determination, from the decoded signaling, of an addition of a second node to the multi-hop network topology: increment a total of a number of descendant nodes; and allocate at least one transmission slot to a number of unused slots in one or more transmission opportunity regions of a slotframe, wherein the slotframe includes, a repeating pattern of one or more transmission opportunity periods for a plurality of nodes in the network; and a storage element configured to store the total of the number of descendant nodes.

In Example 2, the subject matter of Example 1 includes, wherein the processing circuitry is further configured to: in response to a determination that the second node is a child node, wherein the child node is configured to directly communicate with the wireless device: update a list of child nodes associated with the wireless device; increment a total of a number of descendant child nodes associated with the child node; and allocate at least one receive slot to the number of unused slots of the one or more transmission opportunity regions of the slotframe; and wherein the storage element is further configured to store one or more of the list of child nodes and the total of the number of descendant child nodes.

In Example 3, the subject matter of Examples 1-2 includes, wherein the processing circuitry is further configured to allocate the transmission slot based on a node identifier (ID) of the node.

In Example 4, the subject matter of Examples 2-3 includes, wherein the processing circuitry is further configured to allocate the receive slot based on a node ID of the child node.

In Example 5, the subject matter of Examples 2-4 includes, wherein the transmission slot and the receive slot are configured to be in the same position within each respective transmission opportunity region of the slotframe.

In Example 6, the subject matter of Examples 1-5 includes, wherein the processing circuitry is further configured to: in response to a determination, from the indication of the change to the topology, a removal of the second node from the multi-hop network topology: deallocate the transmission slot from the one or more transmission opportunity regions of the slotframe; and decrement the total of the number of descendant nodes.

In Example 7, the subject matter of Example 6 includes, wherein the processing circuitry is further configured to deallocate the transmission slot based on a node ID of the node.

In Example 8, the subject matter of Examples 6-7 includes, wherein the processing circuitry is further configured to: in response to determining that the second node is a child node: deallocate at least one receive slot from the one or more transmission opportunity regions of the slotframe; decrement the total of the number of descendant child nodes; and update the list of child nodes associated with the wireless device.

In Example 9, the subject matter of Example 8 includes, wherein the processing circuitry is further configured to deallocate the at least one receive slot based on a node ID of the child node.

In Example 10, the subject matter of Examples 1-9 includes, wherein the processing circuitry is further configured to: in response to a determination, from the indication of the change to the topology, a removal of a third node from the multi-hop network topology: deallocate at least one transmission slot from the one or more transmission opportunity regions of the slotframe; and decrement the total of the number of descendant nodes.

In Example 11, the subject matter of Example 10 includes, wherein the processing circuitry is further configured to: in response to determining that the third node is a child node: deallocate at least one receive slot from the one or more transmission opportunity regions of the slotframe; decrement the total of the number of descendant child nodes; and update the list of child nodes associated with the wireless device.

In Example 12, the subject matter of Examples 1-11 includes, wherein the indication of the change to the topology is an information element included in the received signaling.

In Example 13, the subject matter of Examples 1-12 includes, wherein the processing circuitry is further configured to: receive signaling from a candidate parent node in the multi-hop network; decode, from the signaling, a candidate parent node rank to indicate a distance of the candidate parent node to a root node of the multi-hop network; calculate a rank associated with the wireless device and a path cost of reaching the candidate parent node from the wireless device; generate a random offset value for the candidate parent node based on an offset function; and select the candidate parent node as a parent node, in response to: determining that the random offset value and the path cost satisfy a respective threshold condition, and comparing the candidate parent node rank to the rank associated with the wireless device to determine that the distance from the candidate parent node to the root node is less than the distance from the wireless device to the root node; and wherein the storage element is configured to store one or more of the candidate parent node rank, the rank associated with the wireless device, the path cost, and the offset function.

In Example 14, the subject matter of Example 13 includes, wherein the processing circuitry is further configured to: decode from the signaling, a child number indicator to indicate a number of child nodes associated with the candidate parent node; and select the candidate parent as the parent node in response to determining that the child number indicator satisfies a threshold value; and wherein the storage element is configured to store the child number indicator.

In Example 15, the subject matter of Example 14 includes, wherein the received signaling from the candidate parent node includes a Directed Acyclic Graph (DAG) Information Object including the candidate parent node rank and the child number indicator.

In Example 16, the subject matter of Examples 14-15 includes, wherein the processing circuitry is further configured to: calculate a parent node switch probability; and select the candidate parent as the parent node in response to determining that the parent node switch probability satisfies a threshold value.

In Example 17, the subject matter of Examples 13-16 includes,).

In Example 18, the subject matter of Examples 13-17 includes, firmware, wherein the firmware includes the offset function.

In Example 19, the subject matter of Examples 15-18 includes, wherein the DAG Information Object includes the offset function, wherein the processing circuitry is configured to decode, from the DAG Information Object, the offset function, and wherein the processing circuitry is configured to generate the random offset value for the candidate parent node based on the decoded offset function.

In Example 20, the subject matter of Example 19 includes, wherein the offset function is defined by a gateway node of the multi-hop network.

In Example 21, the subject matter of Examples 12-20 includes, wherein the random offset value is a fixed value.

In Example 22, the subject matter of Examples 14-21 includes, wherein the wireless device receives the signaling in response to transmitting a DAG Information Solicitation (DIS) to one or more nodes of the multi-hop network to solicit a DIO.

In Example 23, the subject matter of Examples 1-22 includes, wherein during a network formation state, the node and one or more additional nodes of the multi-hop wireless network are configured to communicate via a shared broadcast slot of the slotframe.

In Example 24, the subject matter of Examples 1-23 includes, wherein during a network operation state, a slotframe period of the slotframe is greater than a slotframe period of the slotframe during a network formation state.

In Example 25, the subject matter of Examples 23-24 includes, wherein during the network operation state, a number of slots of the slotframe is fewer than a number of slots of the slotframe during the network formation state.

In Example 26, the subject matter of Examples 24-25 includes, wherein the number of slots of the slotframe and the slotframe period of the slotframe may change for one or more additional network states of the multi-hop wireless network.

Example 27 is a computer-readable hardware storage device that stores instructions for execution by one or more processors of a station (STA), the instructions to configure the one or more processors to: decode signaling, received from a node of the multi-hop network, to determine an indication of a change to a topology of the multi-hop network; and in response to a determination, from the decoded signaling, of an addition of a second node to the multi-hop network topology: increment a total of a number of descendant nodes; and allocate at least one transmission slot to a number of unused slots in one or more transmission opportunity regions of a slotframe, wherein the slotframe includes, a repeating pattern of one or more transmission opportunity periods for a plurality of nodes in the network.

In Example 28, the subject matter of Example 27 includes, wherein the instructions are to further configure the one or more processors to: in response to a determination that the second node is a child node, wherein the child node is configured to directly communicate with the wireless device: update a list of child nodes associated with the wireless device; increment a total of a number of descendant child nodes associated with the child node; and allocate at least one receive slot to the number of unused slots of the one or more transmission opportunity regions of the slotframe.

In Example 29, the subject matter of Examples 27-28 includes, wherein the instructions are to further configure the one or more processors to allocate the transmission slot based on a node identifier (ID) of the node.

In Example 30, the subject matter of Examples 27-29 includes, wherein the instructions are to further configure the one or more processors to allocate the receive slot based on a node ID of the child node.

In Example 31, the subject matter of Examples 27-30 includes, wherein the transmission slot and the receive slot are configured to be in the same position within each respective transmission opportunity region of the slotframe.

In Example 32, the subject matter of Examples 27-31 includes, wherein the instructions are to further configure the one or more processors to: in response to a determination, from the indication of the change to the topology, a removal of the second node from the multi-hop network topology: deallocate the transmission slot from the one or more transmission opportunity regions of the slotframe; and decrement the total of the number of descendant nodes.

In Example 33, the subject matter of Example 32 includes, wherein the instructions are to further configure the one or more processors to deallocate the transmission slot based on a node ID of the node.

In Example 34, the subject matter of Examples 32-33 includes, wherein the instructions are to further configure the one or more processors to: in response to determining that the second node is a child node: deallocate at least one receive slot from the one or more transmission opportunity regions of the slotframe; decrement the total of the number of descendant child nodes; and update the list of child nodes associated with the wireless device.

Example 35 is a system comprising at least one station (STA) configured to operate as a node in a multi-hop wireless network comprising a plurality of nodes, the STA configured to: decode signaling, received from a node of the multi-hop network, to determine an indication of a change to a topology of the multi-hop network; in response to a determination, from the decoded signaling, of an addition of a second node to the multi-hop network topology: increment a total of a number of descendant nodes; and allocate at least one transmission slot to a number of unused slots in one or more transmission opportunity regions of a slotframe, wherein the slotframe includes, a repeating pattern of one or more transmission opportunity periods for a plurality of nodes in the network; and in response to a determination, from the indication of the change to the topology, a removal of the second node from the multi-hop network topology: deallocate the transmission slot from the one or more transmission opportunity regions of the slotframe; and decrement the total of the number of descendant nodes.

Example 36 is at least one machine-readable medium including instructions that, when executed by processing circuitry, cause the processing circuitry to perform operations to implement of any of Examples 1-35.

Example 37 is an apparatus comprising means to implement of any of Examples 1-35.

Example 38 is a system to implement of any of Examples 1-35.

Example 39 is a method to implement of any of Examples 1-35.

What is claimed is:

1. An apparatus of a wireless device configured to operate as a node in a multi-hop wireless network comprising a plurality of nodes, the apparatus, comprising:
    processing circuitry configured to:
    decode signaling, received from a node of the multi-hop network, to determine an indication of a change to a topology of the multi-hop network; and
    in response to a determination, from the decoded signaling, of an addition of a second node to the multi-hop network topology:
    increment a total of a number of descendant nodes; and
    allocate at least one transmission slot to a number of unused slots in one or more transmission opportunity regions of a slotframe, wherein the slotframe includes a repeating pattern of one or more transmission opportunity periods for a plurality of nodes in the network; and
    a storage element configured to store the total of the number of descendant nodes; and
    in response to a determination that the second node is a child node, wherein the child node is configured to directly communicate with the wireless device:
    update a list of child nodes associated with the wireless device;
    increment a total of a number of descendant child nodes associated with the child node; and
    allocate at least one receive slot to the number of unused slots of the one or more transmission opportunity regions of the slotframe; and
    wherein the storage element is further configured to store one or more of the list of child nodes and the total of the number of descendant child nodes.

2. The apparatus of claim 1, wherein the processing circuitry is further configured to allocate the transmission slot based on a node identifier (ID) of the node.

3. The apparatus of claim 1, wherein the processing circuitry is further configured to allocate the receive slot based on a node ID of the child node.

4. The apparatus of claim 1, wherein the transmission slot and the receive slot are configured to be in the same position within each respective transmission opportunity region of the slotframe.

5. The apparatus of claim 1, wherein the processing circuitry is further configured to:
in response to a determination, from the indication of the change to the topology, a removal of the second node from the multi-hop network topology:
deallocate the transmission slot from the one or more transmission opportunity regions of the slotframe; and
decrement the total of the number of descendant nodes.

6. The apparatus of claim 5, wherein the processing circuitry is further configured to deallocate the transmission slot based on a node ID of the node.

7. The apparatus of claim 5, wherein the processing circuitry is further configured to:
in response to determining that the second node is a child node:
deallocate at least one receive slot from the one or more transmission opportunity regions of the slotframe;
decrement the total of the number of descendant child nodes; and
update the list of child nodes associated with the wireless device.

8. The apparatus of claim 7, wherein the processing circuitry is further configured to deallocate the at least one receive slot based on a node ID of the child node.

9. The apparatus of claim 1, wherein the processing circuitry is further configured to:
in response to a determination, from the indication of the change to the topology, a removal of a third node from the multi-hop network topology:
deallocate at least one transmission slot from the one or more transmission opportunity regions of the slotframe; and
decrement the total of the number of descendant nodes.

10. The apparatus of claim 9, wherein the processing circuitry is further configured to:
in response to determining that the third node is a child node:
deallocate at least one receive slot from the one or more transmission opportunity regions of the slotframe;
decrement the total of the number of descendant child nodes; and
update the list of child nodes associated with the wireless device.

11. The apparatus of claim 1, wherein the indication of the change to the topology is an information element included in the received signaling.

12. The apparatus of claim 1, wherein the processing circuitry is further configured to:
receive signaling from a candidate parent node in the multi-hop network;
decode, from the signaling, a candidate parent node rank to indicate a distance of the candidate parent node to a root node of the multi-hop network;
calculate a rank associated with the wireless device and a path cost of reaching the candidate parent node from the wireless device;
generate a random offset value for the candidate parent node based on an offset function; and
select the candidate parent node as a parent node, in response to:
determining that the random offset value and the path cost satisfy a respective threshold condition, and
comparing the candidate parent node rank to the rank associated with the wireless device to determine that the distance from the candidate parent node to the root node is less than the distance from the wireless device to the root node; and
wherein the storage element is configured to store one or more of the candidate parent node rank, the rank associated with the wireless device, the path cost, and the offset function.

13. The apparatus of claim 12, wherein the processing circuitry is further configured to:
decode from the signaling, a child number indicator to indicate a number of child nodes associated with the candidate parent node; and
select the candidate parent as the parent node in response to determining that the child number indicator satisfies a threshold value; and
wherein the storage element is configured to store the child number indicator.

14. The apparatus of claim 13, wherein the received signaling from the candidate parent node includes a Directed Acyclic Graph (DAG) information Object including the candidate parent node rank and the child number indicator.

15. The apparatus of claim 14, wherein the DAG Information Object includes the offset function, wherein the processing circuitry is configured to decode, from the DAG information Object, the offset function, and wherein the processing circuitry is configured to generate the random offset value for the candidate parent node based on the decoded offset function.

16. The apparatus of claim 15, wherein the offset function is defined by a gateway node of the multi-hop network.

17. The apparatus of claim 13, wherein the processing circuitry is further configured to:
calculate a parent node switch probability; and
select the candidate parent as the parent node in response to determining that the parent node switch probability satisfies a threshold value.

18. The apparatus of claim 13, wherein the wireless device receives the signaling in response to transmitting a DAG Information Solicitation (DIS) to one or more nodes of the multi-hop network to solicit a DIO.

19. The apparatus of claim 12, wherein the random offset value is within a value range of (0, 1).

20. The apparatus of claim 12, further comprising firmware, wherein the firmware includes the offset function.

21. The apparatus of claim 12, wherein the random offset value is a fixed value.

22. The apparatus of claim 1, wherein during a network formation state, the node and one or more additional nodes of the multi-hop wireless network are configured to communicate via a shared broadcast slot of the slotframe.

23. The apparatus of claim 22, wherein during the network operation state, a number of slots of the slotframe is fewer than a number of slots of the slotframe during the network formation state.

24. The apparatus of claim 1, wherein during a network operation state, a slotframe period of the slotframe is greater than a slotframe period of the slotframe during a network formation state.

25. The apparatus of claim 24, wherein the number of slots of the slotframe and the slotframe period of the slotframe may change for one or more additional network states of the multi-hop wireless network.

26. A non-transitory machine readable medium that stores instructions for execution by one or more processors of a station (STA), the instructions to configure the one or more processors to:
- decode signaling, received from a node of the multi-hop network, to determine an indication of a change to a topology of the multi-hop network; and
- in response to a determination, from the decoded signaling, of an addition of a second node to the multi-hop network topology:
- increment a total of a number of descendant nodes; and
- allocate at least one transmission slot to a number of unused slots in one or more transmission opportunity regions of a slotframe, wherein the slotframe includes a repeating pattern of one or more transmission opportunity periods for a plurality of nodes in the network; and in response to a determination that the second node is a child node, wherein the child node is configured to directly communicate with the wireless device:
- update a list of child nodes associated with the wireless device;
- increment a total of a number of descendant child nodes associated with the child node; and
- allocate at least one receive slot to the number of unused slots of the one or more transmission opportunity regions of the slotframe.

27. The non-transitory machine readable medium of claim 26, wherein the instructions are to further configure the one or more processors to allocate the transmission slot based on a node identifier (ID) of the node.

28. The non-transitory machine readable medium of claim 26, wherein the instructions are to further configure the one or more processors to allocate the receive slot based on a node ID of the child node.

29. The non-transitory machine readable medium of claim 26, wherein the transmission slot and the receive slot are configured to be in the same position within each respective transmission opportunity region of the slotframe.

30. The non-transitory machine readable medium of claim 26, wherein the instructions are to further configure the one or more processors to:
- in response to a determination, from the indication of the change to the topology, a removal of the second node from the multi-hop network topology:
- deallocate the transmission slot from the one or more transmission opportunity regions of the slotframe; and
- decrement the total of the number of descendant nodes.

31. The non-transitory machine readable medium of claim 30, wherein the instructions are to further configure the one or more processors to deallocate the transmission slot based on a node ID of the node.

32. The non-transitory machine readable medium of claim 30, wherein the instructions are to further configure the one or more processors to:
- in response to determining that the second node is a child node:
- deallocate at least one receive slot from the one or more transmission opportunity regions of the slotframe;
- decrement the total of the number of descendant child nodes; and
- update the list of child nodes associated with the wireless device.

33. A system comprising at least one station (STA) configured to operate as a node in a multi-hop wireless network comprising a plurality of nodes, the STA configured to:
- decode signaling, received from a node of the multi-hop network, to determine an indication of a change to a topology of the multi-hop network;
- in response to a determination, from the decoded signaling, of an addition of a second node to the multi-hop network topology:
- increment a total of a number of descendant nodes; and
- allocate at least one transmission slot to a number of unused slots in one or more transmission opportunity regions of a slotframe, wherein the slotframe includes a repeating pattern of one or more transmission opportunity periods for a plurality of nodes in the network; and
- in response to a determination, from the indication of the change to the topology, a removal of the second node from the multi-hop network topology:
- deallocate the transmission slot from the one or more transmission opportunity regions of the slotframe; and
- decrement the total of the number of descendant nodes; and
- in response to a determination that the second node is a child node, wherein the child node is configured to directly communicate with the STA:
- update a list of child nodes associated with the STA;
- increment a total of a number of descendant child nodes associated with the child node; and
- allocate at least one receive slot to the number of unused slots of the one or more transmission opportunity regions of the slotframe.

* * * * *